(12) United States Patent
Winstead et al.

(10) Patent No.: US 6,430,274 B1
(45) Date of Patent: *Aug. 6, 2002

(54) VALIDATION QUERY BASED ON A SUPERVISORY SIGNAL

(75) Inventors: Regina Lisa Winstead, Suwanee, GA (US); David Jordan, Alexandria, VA (US)

(73) Assignee: WorldComm Inc., Clinton, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,965

(22) Filed: Jan. 18, 2000

(Under 37 CFR 1.47)

Related U.S. Application Data

(63) Continuation-in-part of application No. 09/224,491, filed on Dec. 31, 1998, now Pat. No. 6,031,898, which is a continuation of application No. 08/671,184, filed on Jul. 27, 1996.

(51) Int. Cl.[7] .................... H04M 15/00; H04M 17/00
(52) U.S. Cl. ......................... 379/114.14; 379/121.01; 379/144.02; 379/154
(58) Field of Search .................. 379/111, 112, 379/114, 115, 117, 118, 120, 121, 130, 134, 138, 144, 154, 201, 207, 91.01, 91.02

(56) References Cited

U.S. PATENT DOCUMENTS

| | | | |
|---|---|---|---|
| 4,797,910 A | 1/1989 | Daudelin | 379/67.1 |
| 5,003,584 A | 3/1991 | Benyacar et al. | 379/119 |
| 5,043,983 A | 8/1991 | Dorst et al. | 379/96 |
| 5,185,781 A | 2/1993 | Dowden et al. | 379/67.1 |
| 5,187,740 A | 2/1993 | Swaim et al. | 379/209 |
| 5,210,789 A * | 5/1993 | Jeffus et al. | 379/127 |
| 5,223,699 A | 6/1993 | Flynn et al. | 379/144 |
| 5,287,403 A | 2/1994 | Atkins et al. | 379/144 |
| 5,319,701 A | 6/1994 | Hird et al. | 379/132 |
| 5,414,754 A | 5/1995 | Pugh et al. | 379/67.1 |
| 5,463,677 A | 10/1995 | Bash et al. | 379/144 |
| 5,483,581 A | 1/1996 | Hird et al. | 379/144 |
| 5,627,887 A | 5/1997 | Freedman | 379/112 |
| 5,633,919 A * | 5/1997 | Hogan et al. | 379/115 |
| 5,655,013 A | 8/1997 | Gainsboro | 379/188 |
| 6,031,898 A * | 2/2000 | Jordan | 379/114 |

* cited by examiner

Primary Examiner—Binh Tieu

(57) ABSTRACT

A telephone system and method is provided for delaying authorization validation queries until after a called party accepts a telephone call. Queries are avoided not only in cases where the called phone line is busy or not answering, but also in cases where the called party declines to accept the charges. Because authorization validation queries typically take less than half a second, parties are not significantly affected by the delay.

30 Claims, 4 Drawing Sheets

VALIDATION QUERY BASED ON A SUPERVISORY SIGNAL

CROSS-REFERENCE TO RELATED APPLICATIONS

This application is a continuation-in-part of application Ser. No. 09/224,491, filed Dec. 31, 1998 now U.S. Pat. No. 6,031,898, which is a continuation of application Ser. No. 08/671,184, filed Jun. 27, 1996, the contents of which are hereby incorporated by reference.

BACKGROUND OF THE INVENTION

1. Field of the Invention

The present invention relates generally to telephone systems, and in particular, to a method for authorizing and validating telephone calls.

2. Description of the Related Art

In telephone communication systems, telephone calls are generally charged to the account of the originating telephone. In many situations, however, other billing methods are desired. For instance, a call originator may wish to place a collect call, where the receiving party, rather than the call originator, is billed for the call. A collect call may be desired where the call is for the primary benefit of the receiver or where the account associated with the receiving phone belongs to the originating caller himself. Alternatively, an originating caller may wish to have a call charged to a third party telephone account or to a credit card account, such as a Local Exchange Card (LEC) offered by a local telephone company. Alternative billing schemes benefit users by providing more convenient methods of billing and benefit phone companies by increasing the number of revenue sources.

Because it is difficult to verify the identity of a user and because an account, although previously valid, may no longer be valid, there is a serious potential for abuse of alternative billing schemes. Because such fraudulent use of phone services results in lost revenue for phone companies, fraud is compensated for with higher rates to paying customers. It is important, therefore, to phone companies and paying customers, to insure against fraudulent use of alternative billing schemes.

In order to reduce fraudulent use of alternative billing schemes, some method must exist for validating the authority of a user to employ one of these alternative billing schemes. In a collect call situation, for instance, a method must exist for verifying whether the receiving party or the account associated with the receiving telephone is properly authorized to accept a collect call. Such verification might include insuring that the account associated with the receiving phone is current, that its bill paying history is adequate and that the account holder has not previously declared that collects calls will not be accepted. In the case of third party billing or credit card billing, a method must exist for verifying the existence of the credit account or of the third party to be billed and, possibly, for requesting authorization from the credit card company or the third party.

Currently, many phone companies employ Line Information Data Bases (LIDBs) for validating authorizations. LIDBs are private data bases providing such services as Originating Line Number Screening, Calling Card Validation, Billing Number Screening, Calling Card Fraud and Public Telephone Checks. LIDBs typically contain all of the valid telephone and card numbers in their regions and the necessary information to perform billing verification. Upon receipt of authorization from LIDB, the telephone company will connect the call to the receiving party. Note that if the call is a collect call, the telephone company will have to receive authorization from the receiving party, in addition to the LIDB authorization. LIDBs are typically organized regionally as stand-alone systems. Efforts are under way, however, to integrate regional LIDBs into a larger entity.

In addition to LIDBs, Billing Number Screening (BNS) data bases are also employed for authorization validation. Essentially, a BNS is a telephone company internal data base for maintaining histories of user names, credit card numbers and phone numbers, especially those which have a history of failure to pay or a history of failure to receive LIDB approval. A BNS may also contain cross references between receivers who routinely decline to accept charges from particular originators. A BNS is typically employed as a pre-screen or filter which serves to terminate a requested call, based on prior history, prior to initiating an LIDB query.

In operation, upon receiving a request for an alternative billing scheme, a telephone company will attempt to validate authorization. After checking other internal databases for validation, the telephone system queries an external LIDB. If the LIDB grants authorization to make the requested alternative billing call, the phone system dials the requested number and waits for a response. If the response is a busy tone, the call is terminated. If the line is not busy but, after some predetermined number of rings, there is no answer, the phone system declares time-out and terminates the call. If, however, an off-hook condition is detected, that is, if someone picks up the dialed telephone, then the call originator and the requested party are connected. In a collect call situation, of course, the parties are not connected until the requested party accepts the charges.

While LIDBs reduce losses associated with alternative billing schemes, they come with a heavy price. For every validation query, regardless of whether authorization is granted, the phone company is charged a query fee. For some telephone companies these query fees can run into the tens of millions of dollars per month. These costs are generally passed on to consumers in the form of higher rates for service.

One area of particular concern to telephone companies, with respect to LIDB costs, is collect-call-only telephones. Collect-call-only telephones are telephones which are designed to make collect calls and no others. These phones are employed in order to avoid damage from any attempted theft of coins. These phones are most often employed in correctional facilities and high crime areas.

Briefly, collect-call-only telephones include a keypad and a telephone handset but no coin-receiving slots. These telephones are typically coupled to the phone network through an automated operator system which is designed to preclude direct voice contact between call originators and phone company employees. This is, in part, to avoid harassing comments and threats to live operators.

The details of a typical collect-call-only telephone call is shown in FIG. 1. In order to originate a call, at step 10, an off-hook condition is detected on the collect-call-only telephone, and the automated operator generates a message to the effect of, "please enter the requested number". After dialing the desired number, the caller is asked to provide relevant information at step 20. For example, the automated operator may prompt the caller to "please state your name". After providing name and requested telephone number, the caller waits while the automated operator seeks authorization to place the call. First, at step 30, the Negative database is checked. The Negative database contains numbers that will be blocked from dialing by the caller. These numbers are typically those of called parties who have requested that their telephone numbers be blocked by the caller calling system. At step 35 if the number is blocked, the call is terminated at step 140. If the call is validated by the Negative database, Fraud or BNS database validation is initiated at step 40. If the Fraud or BNS database does not authorize the call at step 50, the call terminates at step 140. If the Fraud or BNS database authorizes the call at step 50, LIDB authorization is initiated at step 60. Likewise, if the LIDB does not authorize the call at step 70, the call terminates at step 140.

If the LIDB authorizes the call in step 70, the automated operator dials the requested party at step 80. If the automated operator detects a busy signal at step 90, the call is terminated at step 140. At step 100, if the requested phone rings a predetermined number of times without answering, the automated operator declares a time-out and, again, the call is terminated at step 140. If, however, the automated operator detects an off-hook condition at step 100, it assumes that an individual has answered the phone and initiates a collect call message at step 110. The collect call message informs the receiver that a collect call has been requested and provides the name of the caller which was recorded at the initiation of the call. If the requested party indicates a willingness to accept the charges for the call at step 120, the caller and the requested party are connected for conversation at step 130. If, at step 120, the requested party refuses to accept the charges, the call is terminated at step 140.

While the collect-call-only telephones may be installed anywhere, a particular location is at correctional facilities, which creates concern for telephone companies which do not typically, apply to other locations. One reason that phone companies are particularly concerned with correctional facility collect-call-only telephones is the high rate of prematurely terminated call. This results from the fact that after LIDB validation authorization, there are still three cases in which a collect call may be prematurely terminated. These three conditions are a busy tone, a no answer time-out and a refusal to accept charges. Only if all of these hurdles are passed can a collect call be completed.

It is estimated that nearly seventy percent of all correctional facility collect calls are prematurely terminated after receiving LIDB authorization validation. Because each LIDB query is billable to the requesting phone company, and because a large number of collect calls from correctional facilities are prematurely terminated, a large number of LIDB charges are incurred without a subsequent billable event, i.e., completed telephone call. In the scenario above, LIDB costs are incurred on approximately ninety-five percent of all calls made, while five only percent are blocked by the Negative or Fraud databases, before the LIDB is checked. While telephone companies in general are subjected to substantial LIDB inquiry charges per billable event, or completed call, telephone companies which serve correctional facilities are subjected to even greater LIDB charges per billable event as a result of the high number of LIDB queries for incomplete calls. Although collect calls from correctional facilities are often subject to an initial fee of between two and three dollars at the outset of a call, these fees are generally destined for the correctional facility itself as a type of user-fee. These fees do not, therefore, offset the costs of unnecessary LIDB queries. As a result, charges for unnecessary LIDB queries are generally be passed on to the paying customers of the telephone companies in the form of higher rates.

A method and system is desired, therefore, which will substantially reduce or eliminate unnecessary database queries related to alternative billing schemes and collect call schemes in particular.

SUMMARY OF THE INVENTION

The present invention is directed toward a system and method for reducing the number of authorization validations in a phone system.

One advantage of the present invention is that is reduces the number of authorization validation queries necessary in alternative billing schemes.

Another advantage of the present invention is that it may be employed in collect call systems, credit card calling systems and third party billing systems.

Another advantage of the present invention is that it can be employed with collect-call-only telephones.

Yet another advantage of the present invention is that it may be employed in existing telephone systems without any additional hardware.

In one embodiment, when a call originator requests an alternative form of billing for a telephone call, an authorization validation is postponed until an off-hook condition is detected on the requested phone line. In this way, if a call is prematurely terminated due to a busy signal or no-answer time-out, no authorization validation charges are incurred.

Delaying an authorization validation until an off-hook condition is detected is possible because, while an authorization validation typically takes less than one-half of a second, a call receiver typically takes more than one-half a second to place the handset to the his or her ear. As a result, the phone connection will be complete by the time the receiving party places the phone to their ear. A typical receiving party, therefore, will not notice any significant time delay between the time of pick-up and the time of connection.

In a preferred embodiment, for collect calls, authorization validations are delayed until after the requested party indicates a willingness to accept charges. In this way, authorization validations charges are avoided, not only for busy signals and time-outs, but also in cases where the requested party declines to accept the calling charges. Authorization validations, thus, are initiated only when absolutely necessary. That is, validations occur only where a requested party has not only answered a phone but also has indicated a willingness to accept the charges for the call.

Although the requested party will be waiting on-hold during the authorization validation, because authorization validations take less the one-half a second, the delay will be practically transparent to the receiver. In the event that authorization validation is denied, the call is terminated. Where permitted, phone companies may choose to record the authorization validation denial, and the reasons therefore, in an internal data base for future reference.

Further features and advantages of the present invention, as well as the structure and operation of various embodiments of the present invention, are described in detail below with reference to the accompanying drawings.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Existing collect-call-only billing scheme telephone systems, such as systems employed in correctional facilities, attempt to validate authorization as soon as an alternative billing request is received. As described above, when a caller initiates a collect-call-only telephone call, a local Negative database is queried, then a local Fraud or BNS database query is executed, followed by a query to an external LIDB. These queries seek to determine whether the third party exists, whether the telephone number is blocked, whether that third party's credit history is sufficient and, possibly, whether that third party is willing to accept such charges. For each LIDB query, the phone company is charged a fee. Only after receiving authorization validation does the system attempt to place the call. If the line of the receiving party is busy or if the receiving party fails to answer, then the LIDB query is wasted in the sense that no billable service is provided by the phone company to a paying customer.

The present invention eliminates most, if not all of the above-described unnecessary LIDB and Fraud database queries. It does so by delaying such queries at least until the called party accepts the collect call charges.

In this way, LIDB charges are avoided not only for calls that will prematurely terminate due to busy signals and non-answers but are also avoided for calls that terminate due to a refusal by the requested party to accept the charges. In such a scheme, the Fraud database is not queried until after the called party accepts the collect call charges. In addition, LIDB authorization query charges are not incurred until it is determined that the requested party is at least willing to accept the charges. This way, the only time a phone company will incur LIDB charges without also conducting a billable event, is when, despite acceptance of the charges by the requested party, the authorization of the requested party to make such an acceptance is denied through a subsequent LIDB authorization validation. As previously stated, because a LIDB query takes less than about 0.5 seconds, a LIDB query initiated after a requested party indicates a willingness to accept charges is concluded quickly enough so as not to significantly inconvenience any of the parties.

Figure 1:
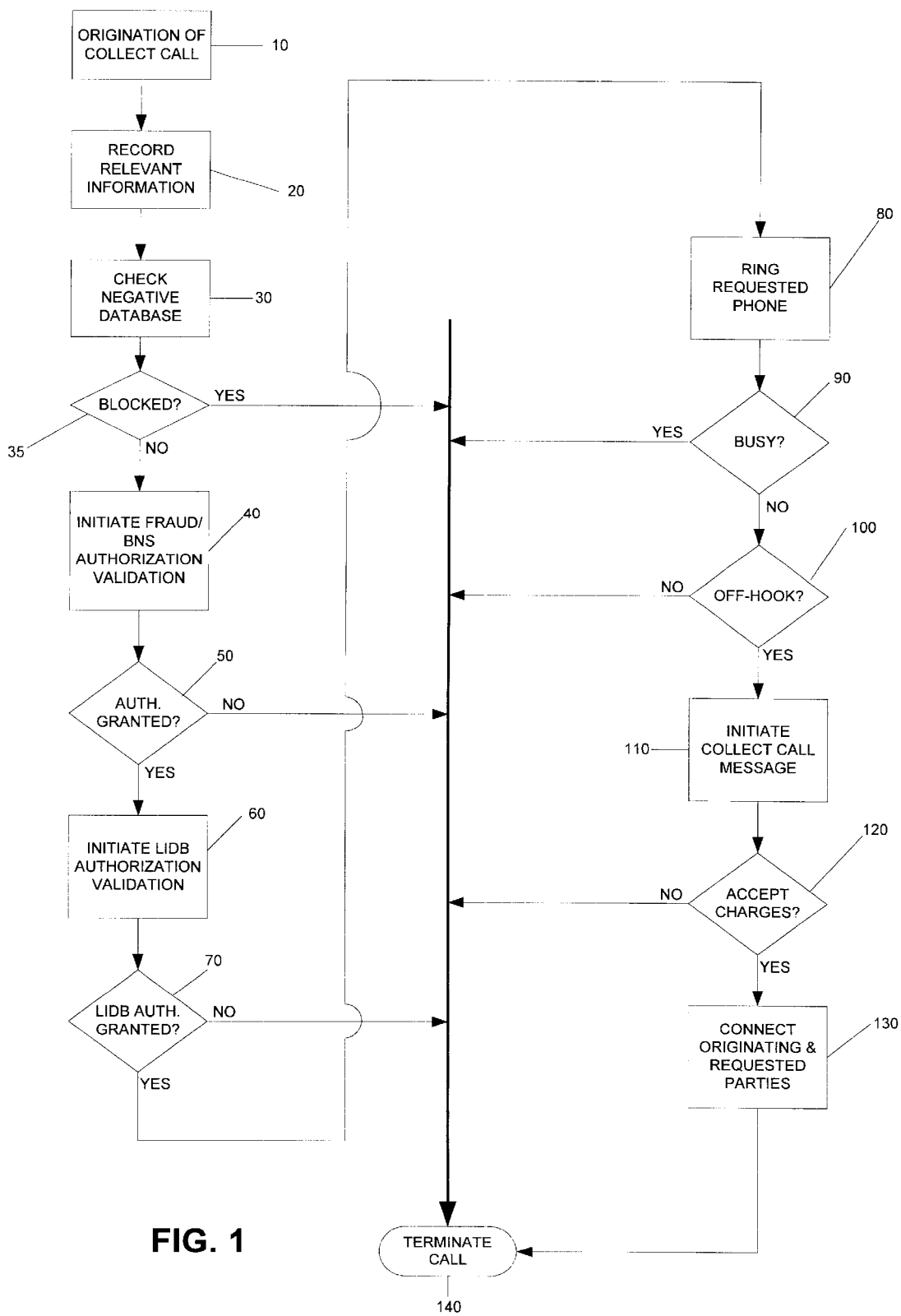
FIG. 1 is a flow diagram of typical collect call routing.
Figure 2:
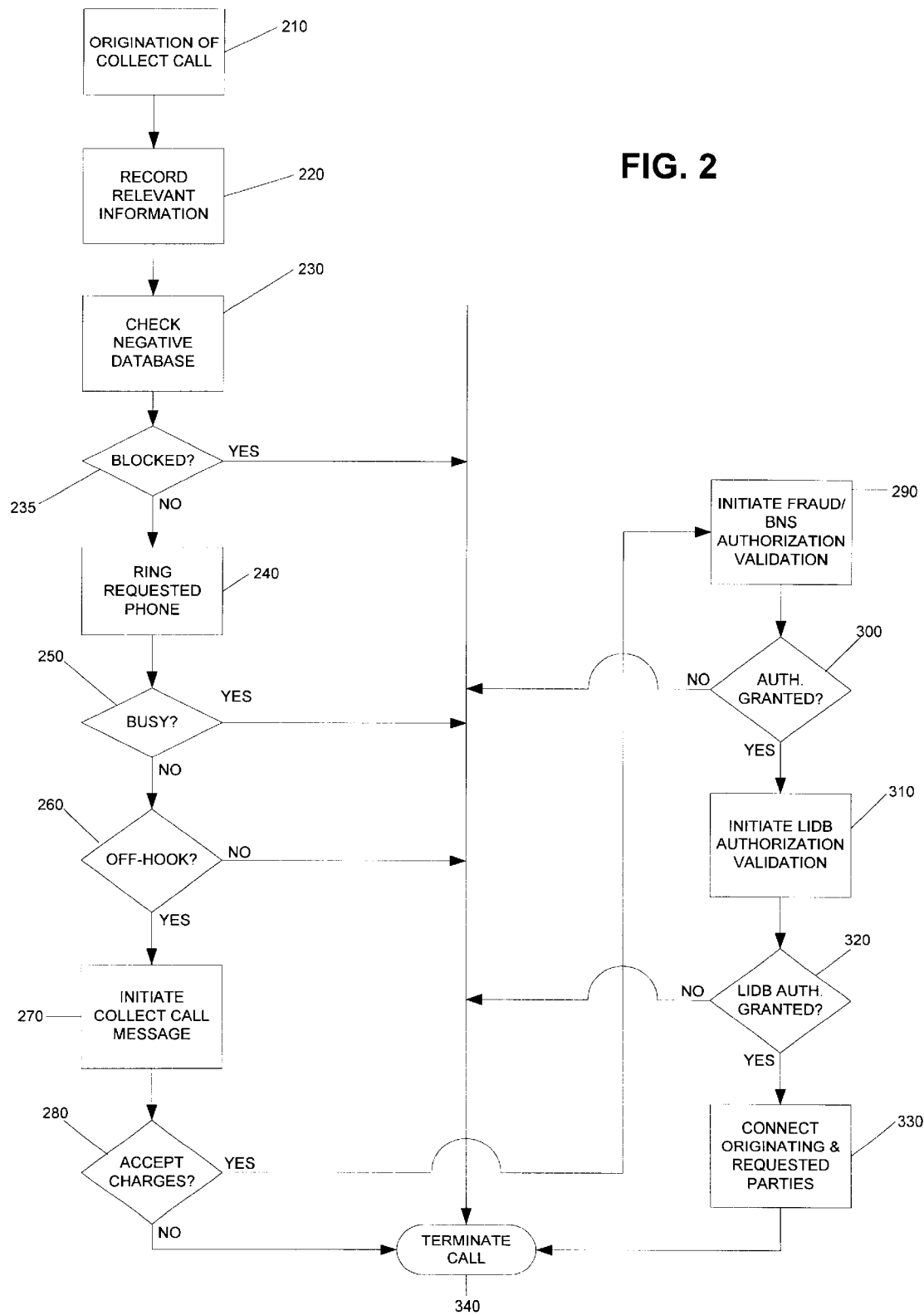
FIG. 2 is a flow diagram of collect call routing according to the preferred embodiment of the present invention.

Referring to FIG. 2, the alternative collect call scheme according to the preferred embodiment of the present invention is shown. Steps 210 through 235 are substantially the same as steps 10 through 35 in the prior art system. In step 235, for instance, as with step 35, if the Negative database does not authorize the call, the call is terminated at step 340. However, if the Negative database authorizes the call in step 235, unlike step 35, the automated operator rings the requested telephone at step 240. This eliminates the early queries to the Fraud and LIDB databases in the prior art.

After the requested phone is rung in step 240 and if the automated operator detects a busy signal at step 250, the call is terminated at step 340. If the requested phone rings a predetermined number of times without answering, the automated operator at step 260 declares a time-out and, again, the call is terminated at step 340. If, however, the automated operator detects an off-hook condition at step 260, it assumes that an individual has answered the phone and initiates a collect call message at step 270.

If the requested party accepts the charges for the call at step 280, the preferred embodiment of the present invention initiates the Fraud database authorization validation at step 290. Although both parties are on hold during this query, it takes a relatively short period of time, especially considering the Fraud database is usually an internal database. If the Fraud or BNS database does not authorize the call at step 300, the call terminates at step 340. If the Fraud or BNS database authorizes the call at step 300, LIDB authorization is initiated at step 310. Likewise, if the LIDB does not authorize the call at step 320, the call terminates at step 340.

Both parties are again on hold during the LIDB query that is initiated in step 310. Because the LIDB authorization is typically completed in less than about 0.5 second, neither of the parties will be unduly inconvenienced by the delay. During the total on-hold period, during both the Fraud and the LIDB check, a prerecorded message can be played and transmitted to receiving party and possibly the calling party. Such a message may be to the effect of "please wait while we process your reply" or a message may inform the parties that a credit check is being performed and will conclude shortly. In addition to, or instead of providing such information, pleasant sounds such as music may be played during the on-hold period, the point being to keep the callers on the line by some combination of not causing the parties to wonder what is happening and keeping them comfortable during any waiting period, no matter how short.

In step 320, LIDB authorization is validated or declined. If verified, because the receiving party has already agreed to accept the charges, the parties are connected at step 330 and the called party is billed accordingly. At the conclusion of the call, the call is terminated in step 340. If declined at step 320, the requested party might be informed of the reason for denial, after which the call is terminated. The fact of the denial along with associated information might be stored in a local database, such as Fraud or BNS, for future reference. This would save later LIDB charges if an inmate at an correctional facility attempts to initiate the same call.

Figure 3:
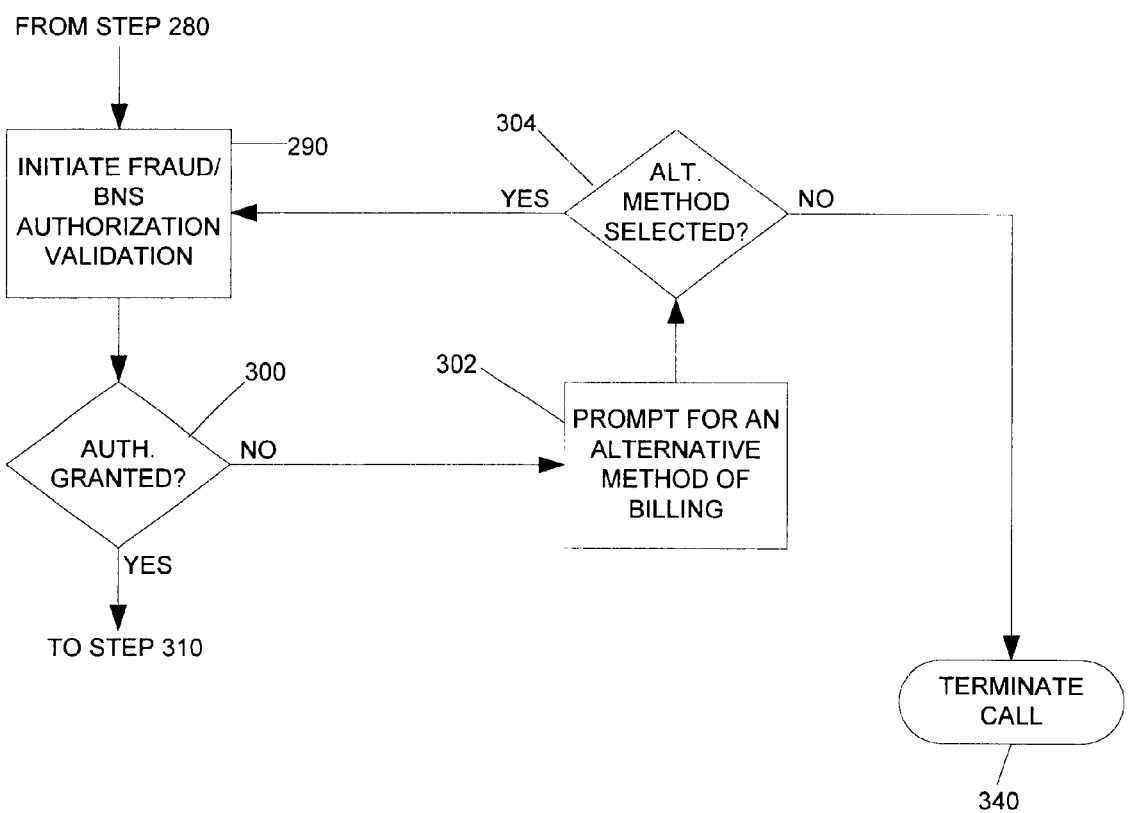
FIG. 3 is a Fraud or BNS database feedback option provided for the collect-call-only scenario of FIG. 2.

Referring to FIG. 3, a Fraud or BNS database feedback option is provided for the collect-call-only scenario of FIG. 2. This would allow the caller to select an alternative billing method of billing. If Fraud or BNS database authorization is denied in step 300, then, in step 302, the caller is prompted to select an alternative method of billing. If the caller selects an alternative method in step 304, the process returns to step 290 and a new BNS query is initiated. If, however, the caller declines to select an alternative method in step 304, then the call is terminated in step 340.

Figure 4:
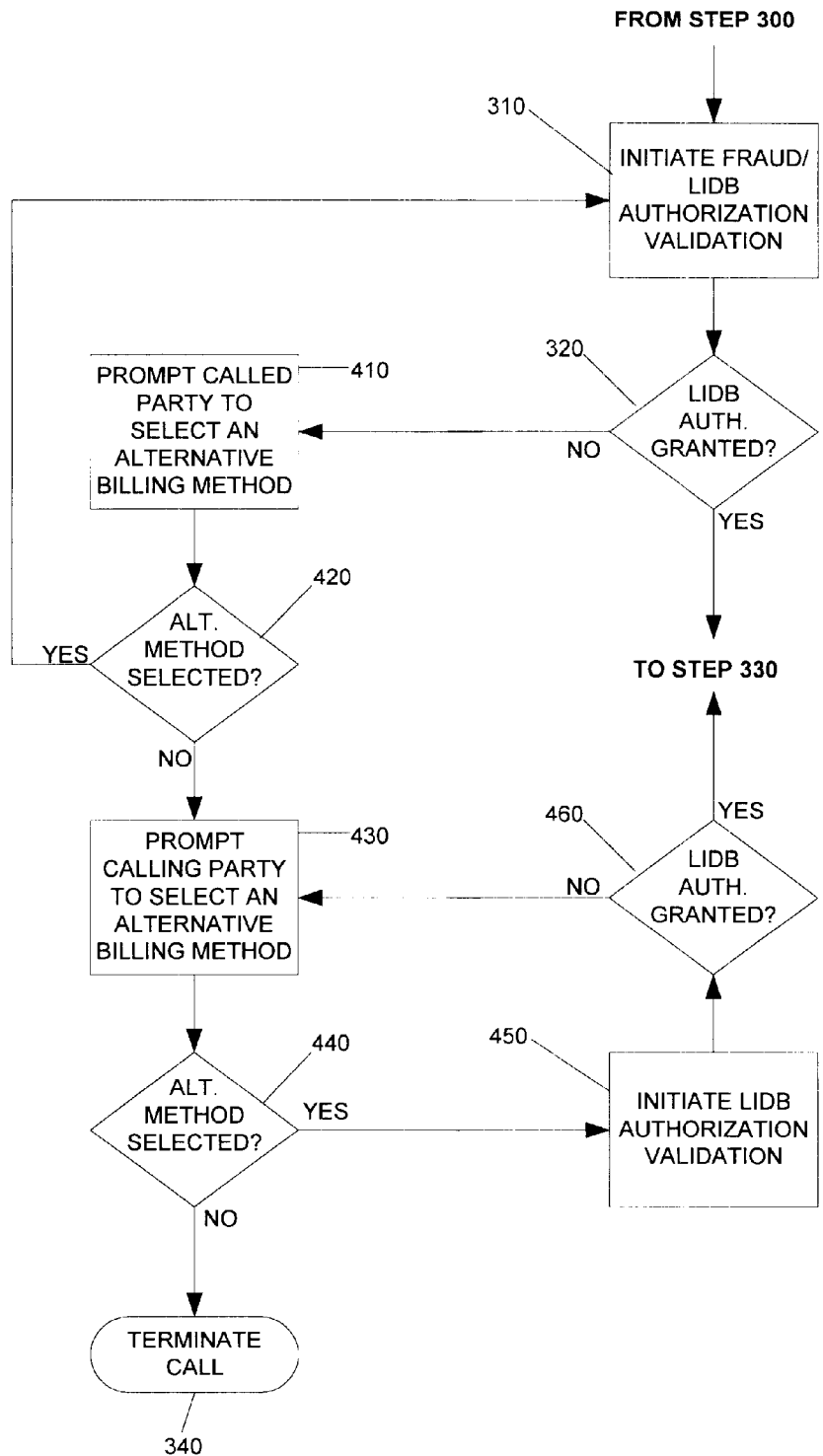
FIG. 4 is an LIDB feedback option provided for the collect-call-only scheme of FIG. 2.

Referring to FIG. 4, an LIDB feedback option for is provided for the collect-call-only scheme of FIG. 2. This feedback scheme differs from the Fraud or BNS database feedback scheme in FIG. 3 because it provides for prompting both called party and the calling party to select an alternative method of billing in the event of an LIDB denial.

In step 310 of the scheme of FIG. 2, after the called party has accepted the call at step 280 and the Fraud database has authorized the call in step 300, the caller remains on the line, possibly on hold, while the LIDB is queried. The called party is thus on the phone and is willing to pay for the call.

If a subsequent LIDB query denies authorization in step 320, due to, for example, a bad credit history associated with the phone of the called party, the called party may be willing to have another account, such as a credit card account, billed for the call.

Following the steps in FIG. 4, if the LIDB denies authorization in step 320, the called party is prompted in step 410 to select an alternative method of billing the call. Upon selecting a new billing method in step 420, a new LIDB query is initiated by returning to step 310. If LIDB again denies authorization in step 320, the called party is again prompted to select another method of payment in step 410.

If the called party declines to select another method of payment in step 420, whether on a first, a second or any subsequent prompt, then, in step 430, the calling party is prompted to select an alternative method of payment. Upon selecting a new billing method in step 440, a new LIDB query is initiated in step 450. Alternatively, a BNS query could precede the LIDB query of step 450. If the LIDB grants authorization in step 460, the scheme proceeds to step 330, as described in relation to FIG. 2. If the LIDB denies authorization in step 460, the calling party is prompted to select another method of payment in step 430. If the caller declines to select an alternative method of billing in step 440, then the call is terminated in step 340.

While the present invention has been shown and described with reference to certain preferred embodiments thereof, it will be understood by those skilled in the art that various changes in form and details may be made thereunto without departing from the spirit and scope of the invention as defined by the appended claims.

What is claimed is:

1. A method for authorizing placement of a telephone call, comprising the steps of:

receiving a request to place a telephone call to a requested telephone;

delaying a query to a fraud database until the called party authorizes the call.

2. The method as recited in claim 1, wherein the fraud database is a Billing Number Screening (BNS) database.

3. The method as recited in claim 1, further comprising the steps of:

recording information from said query; and storing said information in a database for later retrieval.

4. The method as recited in claim 1, subsequent to receiving said call placing request, further comprising the step of:

receiving a billing request to bill the telephone call according to a first billing scheme.

5. The method as recited in claim 4, further comprising the steps of:

recording information provided during said request to bill the telephone call according to a first billing scheme; and storing said information in a billing database for billing a party to the call.

6. The method as recited in claim 4, subsequent to receiving said call placing request, further comprising the steps of:

detecting an off-hook condition;

determining if a called party agrees to accept the telephone call; and terminating the call, if the called party does not accept the call.

7. A method for authorizing a call, comprising the steps of:

receiving a request to place a telephone call to a requested telephone; and after a called party authorized the call, performing the steps of:

querying the fraud database a first time;

determining if the fraud database authorizes the call; and querying a pay-to-use database a first time, if the fraud database authorizes the call.

8. The method as recited in claim 7, further comprising, if the pay-to-use database authorizes the call, the step of:

connecting the called and calling parties.

9. The method as recited in claim 7, further comprising, if the fraud database does not authorize the call, the steps of:

prompting a first party to select a second billing scheme;

receiving a second billing scheme selection from the first party;

querying the fraud database a second time;

querying the pay-to-use database, if the fraud database authorizes the call; and connecting the called and calling parties, if the pay-to-use database authorizes the call.

10. The method as recited in claim 9, further comprising, if the fraud database does not authorize the call for a second time, the step of:

terminating the call.

11. The method as recited in claim 7, further comprising, if the pay-to-use database does not authorize the call, the step of:

prompting a first party to select a second billing scheme;

receiving a second billing scheme selection from the first party;

querying the pay-to-use database a second time; and connecting the called and calling parties, if the pay-to-use database authorizes the call.

12. The method as recited in claim 11, further comprising, if the pay-to-use database does not authorize the call for a second time, the step of:

terminating the call.

13. The method as recited in claim 11, further comprising, if the pay-to-use database does not authorize the call for a second time, the steps of:

prompting a second party to select a third billing scheme;

receiving a third billing scheme selection from the second party;

querying the pay-to-use database a third time; and connecting the called and calling parties, if the pay-to-use database authorizes the call.

14. The method as recited in claim 1, wherein said telephone call is a collect telephone call requested from a collect-call-only telephone.

15. A system for authorizing placement of a telephone call, comprising: means for receiving a request to place a telephone call to a requested telephone; means for delaying a query to a fraud database until the called party authorizes the call.

16. The system as recited in claim 15, wherein the fraud database is a Billing Number Screening (BNS) database.

17. The system as recited in claim 15, further comprising:

means for recording information from said query; and means for storing said information in a database for later retrieval.

18. The system as recited in claim 15, further comprising:

means for receiving a billing request to bill the telephone call according to a first billing scheme subsequent to receiving said call placing request.

19. The system as recited in claim 18, further comprising:

means for recording information provided during said request to bill the telephone call according to a first billing scheme; and means for storing said information in a billing database for billing a party to the call.

20. The system as recited in claim 18, further comprising:

means for detecting an off-hook condition;

means for determining if a called party agrees to accept the telephone call; and means for terminating the call, if the called party does not accept the call.

21. A system for authorizing a call, comprising:

means for receiving a request to place a telephone call to a requested telephone; and means for, after a called party authorized the call, querying the fraud database a first time, determining if the fraud database authorizes the call, and querying a pay-to-use database a first time, if the fraud database authorizes the call.

22. The system as recited in claim 21, further comprising:

means for connecting the called and calling parties.

23. The system as recited in claim 21, further comprising:

means for prompting a first party to select a second billing scheme;

means for receiving a second billing scheme selection from the first party;

means for querying the fraud database a second time;

means for querying the pay-to-use database, if the fraud database authorizes the call; and means for connecting the called and calling parties, if the pay-to-use database authorizes the call.

24. The system as recited in claim 23, further comprising:

means for terminating the call.

25. The system as recited in claim 21, further comprising:

means for prompting a first party to select a second billing scheme;

means for receiving a second billing scheme selection from the first party;

means for querying the pay-to-use database a second time; and means for connecting the called and calling parties, if the pay-to-use database authorizes the call.

26. The system as recited in claim 25, further comprising:

means for terminating the call.

27. The system as recited in claim 25, further comprising:

means for prompting a second party to select a third billing scheme;

means for receiving a third billing scheme selection from the second party;

means for querying the pay-to-use database a third time; and means for connecting the called and calling parties, if the pay-to-use database authorizes the call.

28. The system as recited in claim 15, wherein said telephone call is a collect telephone call requested from a collect-call-only telephone.

29. A method for authorizing placement of a telephone call, comprising the steps of:

receiving a request from a caller to place a telephone call to a requested telephone; and querying a fraud database after a called party accepts collect charges for billing to an account associated with the request telephone.

30. A system for authorizing a call, comprising:

means for receiving a request to place a telephone call to a requested telephone; and means for querying a fraud database after a called party accepts collect call charges for billing to an account associated with the requested telephone.

* * * * *